FIG. I.

INVENTORS
Leland A. Schlabach &
Laban E. Lesster.

United States Patent Office 3,504,266
Patented Mar. 31, 1970

3,504,266
INVERTER APPARATUS OPERATIVE WITH VARIABLE INPUT SOURCES
Leland A. Schlabach, Pittsburgh, Pa., and Laban E. Lesster, Crofton, Md., assignors to Westinghouse Electric Corporation, Pittsburgh, Pa., a corporation of Pennsylvania
Filed Mar. 21, 1968, Ser. No. 714,936
Int. Cl. H02m 7/44
U.S. Cl. 321—5                                    9 Claims

ABSTRACT OF THE DISCLOSURE

An inverter commutating circuit is provided including commutating control switching devices and inductive and capacitive elements to commutate the plurality of controlled switching devices. When activated the commutation controlled switching device provides a discharge path for the capacitive elements through said inductance elements with the capacitance elements resonantly charging to selected voltage levels. A clamping circuit is employed including a clamping controlled switching device, and a sensing circuit is utilized to sense when the desired voltage is reacted and in response thereto activate the clamping controlled switching device to thereby clamp the commutating capacitive elements at the selected voltage level which is required for proper operation of the commutating circuit.

BACKGROUND OF THE INVENTION

The present invention relates to inverter apparatus of the forced commutation type and, more particularly, to inverter apparatus operative with input sources having varying or controllable output levels.

In inverter apparatus using controlled switching devices, such as silicon controlled rectifiers, it is necessary that some means be provided for turning off selected of the controlled rectifiers at predetermined times. A forced commutation technique may be employed for turning off the selected controlled rectifier devices by reverse biasing them through a commutation circuit including auxiliary controlled switching devices and inductive and capacitive elements. A forced commutation inverter system is shown in copending application Ser. No. 520,497, filed Jan. 19, 1966, by John Rosa, now Patent No. 3,406,-325, and assigned to the same assignee as the present application, which requires only the use of two auxiliary controlled rectifiers in a single or polyphase inverter system.

Inverter systems are commonly utilized to supply alternating current to an AC motor. It is necessary for the proper operation of the AC motor that the current and voltage levels supplied to the motor be accurately controlled. The direct current operating source for the inverter may be controlled to vary its output voltage, so as to obtain a desired inverter output voltage. The DC operating voltage and output frequency of the inverter may be reduced proportionately to obtain highly efficient operation of an AC motor at a lower speed. An alternate approach is to phase back the conduction angle of the inverter controlled switching devices to obtain reduced output voltage, frequency being phased back so as to affect the conduction and speed of operation of an AC motor. However, this introduces a high harmonic content into the output thereby reducing the operating efficiency of the motor being driven by the inverter.

Another factor to be considered in forced commutation systems is that the commutation capacitive elements of the commutation circuit must be charged to predetermined levels to insure proper commutation. If these levels should vary below desired levels, the commutation ability of the system may be reduced thereby limiting the amount of current carried by the controlled rectifiers that may be commutated. Thus, as the input DC voltage becomes lower or is purposely reduced, the peak current that can be commutated by commutation current inverter becomes lower. If the current supplied to the motor being driven by the inverter is accordingly limited in magnitude, this will affect the proper operation thereof as well as causing harmonics to be introduced into the output voltage waveform. It is thus essential for the proper operation of the motor that full current capability of the motor be maintained at all times independent of voltage variations in the input DC source.

SUMMARY OF THE INVENTION

Broadly, the present invention provides an inverter system of the forced commutation type operative from a direct current source which utilizes a plurality of controlled switching devices for selectively supplying alternating current to a load. A commutation circuit is provided for effecting the commutation of the controlled switching devices and includes commutation controlled switching devices and capacitive and inductive elements. The capacitive elements are permitted to charge to selected voltage levels independent of the direct current source level so as to insure proper commutation of the controlled switching devices.

DESCRIPTION OF THE PREFERRED EMBODIMENTS

Figure 1:
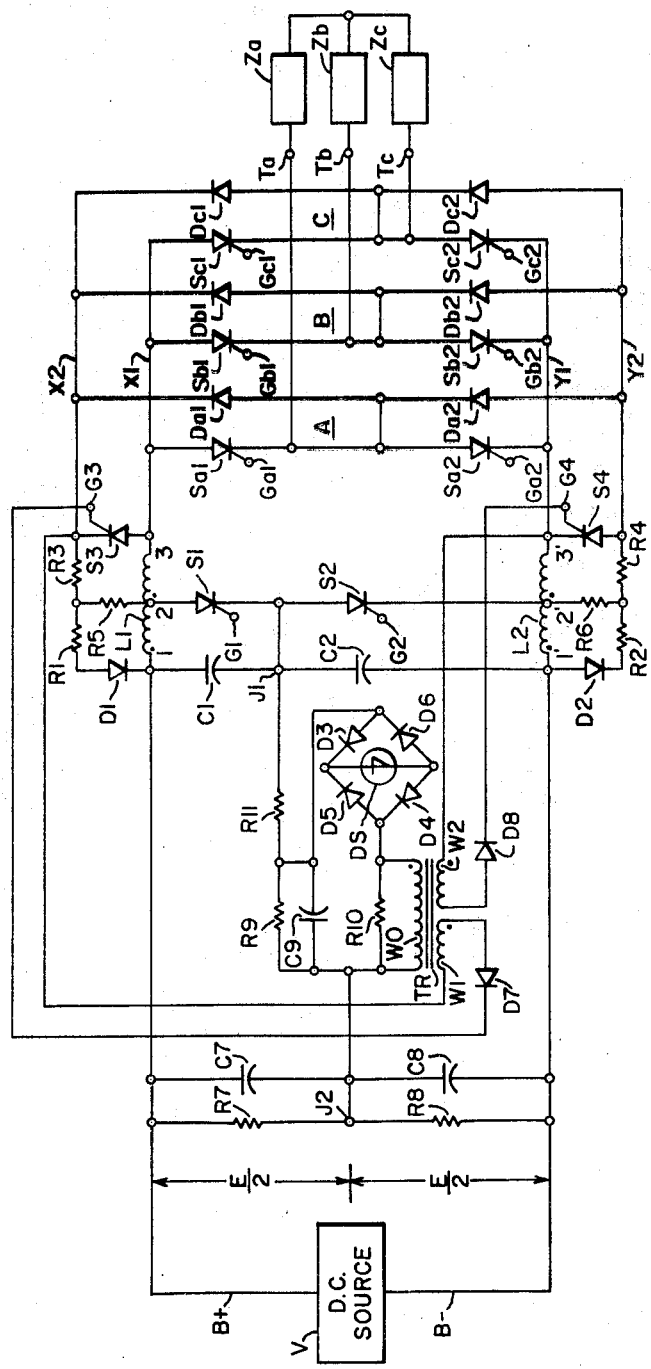
FIGURE 1 is a schematic block diagram of one embodiment of the present invention.

Referring to FIG. 1, an inverter system is shown including a DC source V acting as the operating source therefor. The DC source V supplies an output voltage E between the B+ and a B− line as shown. The inverter as shown is intended to supply a three-phase load including impedances $Z_a$, $Z_b$ and $Z_c$ with an alternating current waveform. The load impedance may, for example, comprise the windings of a three-phase AC motor. To supply the bidirectional conducting path through the load impedances $Z_a$, $Z_b$ and $Z_c$, a bridge circuit including legs A, B and C is provided. In each of the legs, a controlled switching device is included, which may, for example, comprise silicon controlled rectifiers. Thus, leg A includes controlled rectifiers $S_{a1}$ and $S_{a2}$; leg B includes controlled rectifiers $S_{b1}$ and $S_{b2}$ and leg C includes controlled rectifiers $S_{c1}$ and $S_{c2}$. At the junction in leg A between controlled rectifiers $S_{a1}$ and $S_{a2}$ is connected a terminal $T_a$ at one end of the load impedance $Z_a$. The junctions of controlled rectifier pairs in the legs B and C are, respectively, connected to the terminal $T_b$ and $T_c$ at the ends of the load impedances $Z_b$ and $Z_c$, respectively. The other end of the load impedances are commonly connected. The anode electrodes of the top row of controlled rectifiers $S_{a1}$, $S_{b1}$ and $S_{c1}$ are commonly connected to a line X1, and the cathode electrodes of the bottom row of controlled rectifiers $S_{a2}$, $S_{b2}$ and $S_{c2}$ are commonly connected to a line Y1. The controlled rectifiers $S_{a1}$, $S_{a2}$, $S_{b1}$, $S_{b2}$, $S_{c1}$ and $S_{c2}$ are, respectively, provided with gate terminals $G_{a1}$, $G_{a2}$, $G_{b1}$, Gb2, Gc1, and Gc2, with the controlled rectifiers being turned on in response to gating signals applied to the respective gate terminals. Diodes Da1, Db1 and Dc1 are, respectively, connected between the junction point in legs A, B and C and a line X2, with the cathodes thereof toward the line X2. Diodes Da2, Db2 and Dc2 are, respectively, connected between the junction points in legs A, B and C and a line Y2, with the anodes connected to the line Y2.

A commutator circuit is provided for the inverter shown in FIG. 1 and includes a commutating inductor L1 having a winding 1–2 and a winding 2–3 which are connected in series so that the inductor L1 is connected between B+ and the X1 line. Similarly, an inductor L2 including windings 1'–2' and 2'–3' is connected between B— line and the line Y1 line. A pair of commutating capacitors C1 and C2 are connected in series between the B+ and B— line, and a pair of commutating controlled rectifier devices S1 and S2 are connected between the tap points 2 on winding L1 and the tap point 2' on the inductor L2. The junction of the capacitor C1, C2 and the controlled rectifiers S1, S2 are commonly connected at a junction J1. The commutation controlled rectifier devices S1 and S2 are, respectively, provided with gate terminals G1 and G2 to which gating signals are applied to effect the commutation of the bridge controlled rectifiers as will be explained below.

Figure 2:
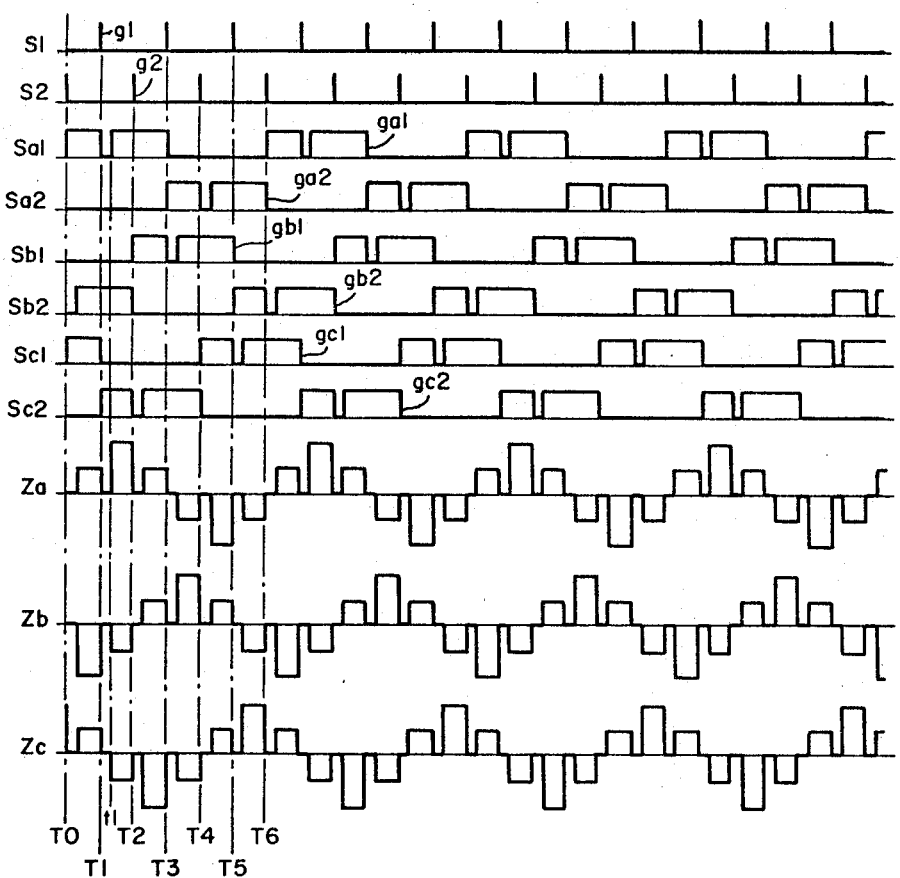
FIGURE 2 is a waveform diagram used in explaining the operation of FIG. 1.

Referring now to FIG. 2, the pulse waveforms applied to the gate electrode of the various controlled rectifiers are indicated in the curves similarly designated as S1, S2, Sa1, Sa2, Sb1, Sb2, Sc1 and Sc2. Commutation of the top row of controlled rectifiers Sa1, Sb1, Sc1 is instigated by the turning on of the commutation controlled rectifier S1. The turning off of the bottom row of controlled rectifiers Sa2, Sb2 and Sc2 is brought about by the turning on of the commutation controlled rectifier S2. The pulse waveforms Sa1 through Sc2 are supplied to the gate electrodes of the bridge controlled rectifiers so as to provide conductive paths through the load impedances Za, Zb and Zc, with these load impedances being supplied with current waveforms as shown in curves designated Za, Zb and Zc in FIG. 2.

During the time interval T0 to T1, controlled rectifiers Sa1, Sc1 and Sb2 are in their conductive state. A circuit path is thus provided from the B+ line through the inductor L1, controlled rectifiers Sa1 and Sc1, to the load impedances Za and Zc, respectively, to provide a positive unit of current thereto as shown in curves Za and Zc of FIG. 2, respectively. The return circuit path is provided through the load impedance Zb in the negative direction to provide two negative units of current thereto, see curve Zb, and through controlled rectifier Sb2, the inductor L2 to the B— line. At the time T1, commutation of the top row of bridge controlled rectifier devices is initiated by the application of a gating pulse G1, as shown in curve S1 of FIG. 2, to the commutating controlled rectifier S1 thereby turning it on. At the time T1 the commutating controlled rectifier S2 is in its turned off state.

Figure 3:
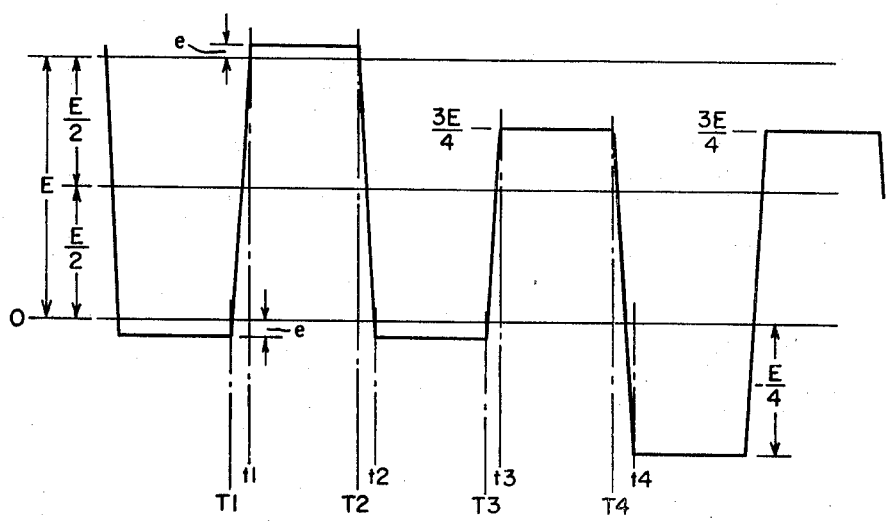
FIG. 3 is a waveform diagram used in explaining the operation of FIG. 1.

Referring now also to FIG. 3, which is a waveform diagram of the voltage variation of the junction J1 between the commutating capacitors C1 and C2. It should be noted that the voltage variation across the capacitors C1 and C2 have an identical waveshape but are 180° out of phase with each other. At a time just prior to the time T1 assume that the capacitor C1 is charged to a positive voltage level $E+e$, where $e$ is a relatively small voltage to which the capacitor charges due to resonant charging effects in the circuit. Conversely, at the time prior to T1 the capacitor C2 will be charged to a negative voltage $-e$.

At the time T1, the turning on of the commutation controlled rectifier S1 provides a discharge path for the capacitor C1 with the capacitor C1 discharging through the winding 1–2 of the inductor L1 and the controlled rectifier S1. Using the dot convention as shown on the inductor L1, with the end 1 being dotted and the end 3 being undotted, the flow of current into the dotted end 1 from the capacitor C1 causes a negative voltage to appear at the end 3 to which the anode electrodes of the controlled rectifier Sa1, Sb1, Sb2 are connected. Thus, the anodes of the top row of controlled rectifiers are rendered negative with respect to the cathodes thereof, and hence these devices are reverse biased and turned off.

During the time interval that the anodes of the top row of bridge devices Sa1, Sb1, Sc1 are at a negative potential, load current is maintained through the load impedances Za, Zb and Zc through a circuit path beginning at the output terminal Tb, through the device Sb2, the winding 1'–2' of the inductor L2, diode D2, resistors R2 and R4, the diode Da2, and Dc2, the impedance elements Za and Zc, and through the impedance element Zb to the terminal Tb. Once the top row of devices is turned off they will begin to sustain positive voltage again until another gating pulse is applied thereto.

In order to permit selected of the bridge controlled rectifiers to be turned on again after commutation, it is necessary that some means be provided for dissipating the energy stored in the reactive elements of the inverter. In the circuit of FIG. 1, an energy dissipating circuit is provided for completing a current path for stored energy in the respective inductors L1 and L2 whenever the reverse bias is removed from a particular row of bridge controlled rectifiers being commutated. The energy recovery circuit for the inductor L1 includes resistors R1, R3, R5, a diode D1 and a clamping controlled rectifier S3. Resistors R1 and R3 are connected in series, with the resistor R5 connecting the junction of the resistors R1 and R3 to the tap point 2 of the inductor L1. The diode D1 is connected from anode to cathode between the free end of the resistor R1 and the B+ line. The controlled rectifier S3 is connected from anode to cathode between the end 3 of the inductor L1 at the line X1 and the free end of the resistor at the line X2. The energy recovery circuit for the inductor L2 is connected identically with that for the inductor L1, with the resistors R2, R4, and R6 corresponding, respectively, to the resistors R1, R3 and R5, the diode D2 corresponding to diode D1 and the clamping controlled rectifier S4 corresponding to the control rectifier S3. The conductive state of the clamping controlled rectifier S3 and S4 is controlled by inputs supplied to gate terminals G3 and G4, respectively, as will be discussed below.

Considering the operation of the energy recovery circuits and taking the recovery circuit for the inductor L1, for example, assume that the clamping controlled rectifier S3 is in its conductive state. Thus, when the current established in inductor L1 has no path through any element of the row of controlled rectifiers Sa1, Sb1, Sc1 at the end of the commutation interval and the anodes of these controlled rectifiers go positive with respect to their cathodes, a circuit path is provided through the controlled rectifier S3, the resistors R3 and R1, and the diode D1 to the B+ line. In this fashion any energy stored in the inductor L1 is dissipated in the resistive elements R1 and R2. The resistive value of the resistors R5 and R6 is made much larger than that of the resistors R1–R3 and R2–R4 in order to reduce the energy dissipation in these resistors.

The conduction of the clamping controlled rectifier S3 thus provides a shunt current dissipating path with the commutating controlled rectifier S1 turning off. The voltage level at the junction J1 is thus clamped at the valve $E+e$ as can be seen in FIG. 3 at a time T1 at the end of the commutation and energy recovery operation. Once the energy has been dissipated, the row of controlled rectifiers that has been commutated may then be turned on again by the application of gate pulses to the respective gate electrodes thereof. The operation of the energy dissipation circuit for the inductor L2 is identical with that of the inductor L1.

At the time T1, the controlled rectifiers Sa1, Sb2 and Sc2 are turned on again by the application of pulses Ga1, Gb2 and Gc2 to the respective gate electrodes, see curves Sa1, Sb2 and Sc2 of FIG. 2. Thus with the turning on of controlled rectifiers Sa1, Sb2 and Sc2 waveforms as shown in curves Za, Zb and Zc of FIG. 3 are supplied to the respective load impedances during the time period T1–T2.

At the time T2, a commutating pulse G2, see FIG. 2, curve S2 is supplied to the controlled rectifier S2 which turns this device on to provide a discharge path for the commutation capacitor C2 therethrough and through winding 1′–2′ of the inductor L2. A reverse voltage is thus induced across the bottom row of controlled rectifier Sa2, Sb2 and Sc2 so that the anodes thereof go negative with respect to the cathodes so as to commutate these devices. During the time interval that the bottom row of controlled rectifier devices is reverse biased, current is maintained through the load impedances Za, Zb and Zc through circuit paths being provided from output terminal Ta, through the load impedance Za, load impedance Zb and Zc and output terminals Tb and Tc, respectively, and diodes Db1 and Dc1, respectively, resistors R3 and R1, diode D1, and through the winding 1–2 of inductor L1 and the controlled rectifier Sa1 to the output terminal Ta. After the bottom row of controlled rectifier devices is commutated, the anodes thereof again go positive with respect to the cathodes thereby forward biasing the controlled rectifier S4, and if it is in its conductive state, it will provide a conductor path therethrough to enable any energy stored in the inductor L2 to dissipate in resistors R2, R4, R6. The commutating controlled rectifier S2 is thereby turned off with the voltage of the junction point J1 being held at a −e value at the time T2 in FIG. 3, with the capacitor C1 being charged to a voltage E+e and the capacitor C2 being charged to a voltage −e. This voltage condition will continue as shown in FIG. 3 until the time T3 of the next commutation.

If the input DC voltage from the source V is maintained at the rated value E and if the clamping control rectifiers S3 and S4 are maintained in their turned on states during subsequent cycles, the inverter apparatus will continue to operate as described with the waveforms being supplied thereto as shown in the curves of FIG. 2 and with output waveforms being developed in the load impedances as shown in curves Za, Zb and Zc thereof. If the input voltage E is the rated value required for the proper operation of the inverter and if the DC source V output voltage drops to a lower value than its rated value E then the commutation ability of the inverter will be affected due to the commutation capacitors C1 and C2 being charged to improper voltage levels. Thus the ability of the commutation circuit to turn off the various bridge control rectifiers Sa1, Sb1, Sc1, Sa2, Sb2, and Sc2 may be affected so that the amount of current that can be terminated from flowing through the devices is reduced. This can result in short circuits being caused through the inverter circuit. It is thus highly desirable that the commutation ability of the commutation circuit is not decreased by the lowering of the input voltage.

A system as shown in FIG. 1 includes circuitry to compensate for any variations in the input DC source V as it affects the voltage levels on capacitors C1 and C2 and to insure that the voltage change across the commutation capacitors C1 and C2 is the rated voltage required for the proper commutation of the bridge controlled rectifier devices for the specified current level. We have previously assumed that in the normal operation of the inverter system that the clamping controlling rectifiers S3 and S4 are in a conductive state immediately after the commutation of the respective top or bottom row of controlled rectifier devices. If, however, the controlled rectifiers S3 and S4 are maintained in their nonconductive state immediately after commutation of the respective top or bottom rows of controlled rectifier devices, the voltage at the junction J1 between the capacitors C1 and C2 may resonate alternately positive and negatively with respect to the rated source voltage E. Due to the resonant condition established between the inductance in the coil L1 and the capacitors C1 and C2, at T1 and also similarly between the capacitors C1 and C2 and the inductor L2 at T2, the voltage to which the respective capacitors may be resonantly charged will be appreciably above the actual input from the DC source V, and this may be cumulatively increased to practically any level over successive cycles of operation. Hence, by maintaining an open circuit across either clamping control rectifier S3 or S4, so permitting the capacitors C1, C2 and inductor L1 or capacitors C1, C2 and inductor L2 to ring until a desired voltage level is reached, then gating on the clamping control rectifiers S3 and S4 when this desired voltage is reached, the junction point J1 is clamped at this voltage level. In this way, the commutation capacitors C1 and C2 may be charged to the voltage required for proper commutation independently of the magnitude of the DC source voltage V.

Thus it becomes imperative that some means be provided for sensing when the voltage across the commutation capacitors C1 and C2 is at the desired value, which, in the presen example, has been assumed to be the voltage E nominally provided by the DC voltage source V. When the desired voltage is reached it is then necessary to provide a turn on signal to the gate electrodes of the respective clamping controlled rectifier devices S3 and S4 to stop the ringing action and clamp the voltage at this level.

Figure 4:
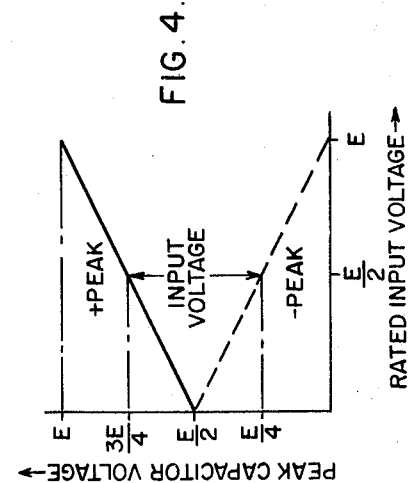
FIG. 4 is a plot of commutating capacitor voltage versus input voltage which is used in explaining the operation of FIG. 1.

FIGURE 4 shows a plot of the peak capacitor voltage on either commutation capacitor C1 or C2 during alternate half cycles of the inverter operation versus the input voltage supplied by the DC source V. The rated voltage is indicated by E. The solid line designated +peak indicates the positive voltage to which the respective commutation capacitors are charged and the dotted line designated as −peak indicates the negative voltage to which the respective commutation capacitors are charged. Considering several examples of this: if the output voltage of the input source V is at its rated value E, then the commutation capacitor will charge positively to substantially the rated voltage E, while the negative charge level will be substantially 0 as shown in FIG. 4; however, if the output voltage of the DC voltage source V should drop to one-half its rated value E/2, it can be seen from FIG. 4 that the commutation capacitors are charged to a positive voltage level 3E/4 and to a negative value of E/4. It should be specifically noted that the absolute sum of the voltage across the commutation capacitors will be at the rated voltage level of E. Moreover, it should also be noted that the difference between the positive and the negative voltage levels will be the magnitude of the input voltage supplied by the input source V as labeled in FIG. 4 between the +peak and −peak curves at the input voltage value E/2. If then the sum of the voltage across the commutation capacitors C1 and C2 can be sensed and an indication given when this sum equals the rated voltage value E, this information can be used to turn on the clamping controlled rectifiers S3 or S4 so as to clamp the voltage level at the junction J1 between the capacitors to this value and thereby stop the ringing action in the resonant circuit C1, C2–L1 or C1, C2–L2 at the rated voltage level.

FIGURE 1 includes a sensing circuit for determining when the capacitor C1 and C2 have charged to the desired level and then to provide turn-on signals to the controlled rectifiers S3 and S4 to clamp the voltage level at the desired level. The sensing circuit includes an input voltage divider network comprising a parallel combination of a resistor R7 and a capacitor C7 connected in series with a parallel combination of a resistor R8 and a capacitor C8. This voltage divider is connected directly across the DC source V. The magnitude of the components R7, C7 and R8, C8 are selected so that one-half of the output voltage of the DC source V is provided across each half of the voltage divider network. Thus, the voltage between a junction point J2 between the parallel circuits R7–C7 and R8–C8 to the B+ line or to the B— line is substantially equal. The voltage between the junction points J1 and J2 may then be determined by solving the following equation:

$$V_{C1}+V_{J12}-V_7=0$$
$$V_{C2}-V_8-V_{J12}=0$$

where $V_{C1}$ is the voltage across C1; $V_{C2}$ is the voltage across C2; $V_7$ and $V_2$ are, respectively, the voltage from the junction point J2 to the B+ line and from the junction point J2 to the B— line; and $V_{J12}$ is the voltage between the junction points J1 to J2. Solving the above equations for $V_{J12}$:

$$2V_{J12}+V_{C1}-V_{C2}+V_8-V_7=0$$

However, since $V_7$ and $V_8$ are equal, this reduces to: $V_{C1}+V_{C2}$ $$V_{J12}=\frac{V_{C1}-V_{C2}}{2}$$

It can thus be seen that a voltage proportional to the algebraic sum of the voltage across the capacitors C1 and C2 appears between the junctions J1 and J. As previously discussed with reference to FIG. 4, this is proportional to the rated voltage whic his is desired to be sensed.

In order to sense the voltage $V_{J12}$, a voltage divider network, including a resistor R9 and a resistor R11, is connected in series between the junctions J1 and J2. A capacitor C9 is connected directly across the resistor R9. Also connected across the resistor R1 is a detection circuit including a primary winding W0 of a transformer TR, which is shunted by a resistor R10, and a diode bridge connected in series with the primary winding W0. A threshold device DS which may comprise a Shockley diode is connected across the output of the diode bridge. The diodes in the diode bridge are so placed that regardless of whether the junction J1 is positive with respect to the junction J2 or vice versa a positive voltage will appear at the anode of the Shockley diode DS. The Shockley diode DS may of course be another type of breakdown device which will breakdown and conduct current therethrough at a low impedance level when a predetermined voltage is reached across the device.

In the sensing circuit of FIG. 1 the function of the capacitor C9 is to provide energy for a pulse of drive to S3 or S4 when the Shockley DS conducts, and the function of the resistor R10 shunting the winding W0 is to clamp the recovery voltage of winding W0 to an acceptable level, and to provide a resistive path for current when the Shockley diode conducts so that it is not prevented from turning on properly by the transformer inductance.

The transformer TR includes a pair of secondary windings W1 and W2. A dot convention as indicated is used in FIGURE 1 for the primary winding W0 and the winding W1 and W2. The dotted end of the secondary winding W1 is connected via a diode D7 to the terminal G3 at the gate electrode of the clamping controlled rectifier S3. The undotted end of the winding W1 is connected to the cathode electrode o fthe device S3. The secondary winding W2 has its dotted end connected to the cathode of the clamping controlled rectifier S4, and its undotted end connected via a diode D8 to the terminal G4 at the gate electrode of the device S4. The Shockley diode DS thus has a voltage developed thereacross which is proportional to the voltage $V_{J12}$ between the junction points J1 and J2 which is proportional to the sum of the voltage developed across the capacitors C1 and C2 in the commutating circuit. The voltage divider resistors R9 and R11 connected between the junction point J1 and J2 are so selected to develop a sufficient voltage across the resistor R9 so that the Shockley diode DS connected in series with the parallel combination of the winding W0 and a resistor R10 will have its breakover voltage exceeded whenever the voltage J12 between the junctions J1 and J2 reaches the desired for $$\frac{V_{C1}-V_{C2}}{2}$$

Whenever this voltage is exceeded, the Shockley diode DS breaks down and provides a low impedance path therethrough so that a pulse of current is supplied through the primary winding W0 which in turn will induce a voltage in the secondary windings W1 and W2 according to the dot convention as shown in FIGURE 1.

Thus with the voltage between the junctions J1 and J2 exceeding the critical value and with the junction J1 positive with respect to the junction J2, for example, a current path will be provided from the junction J1 through the resistor R2, through a diode D3 of the diode bridge, through the Shockley diode DS, a diode D4 of the bridge, into the dotted end of the primary winding W0 and out from the undotted end to the junction point J2. A positive voltage is thus induced at the dotted end of both the windings W1 and W2 in response to the current flow into the dotted end of the primary winding W0. The winding W1 having its dotted end connected to the gate electrode of the controlled rectifier S3 and its undotted end connected to the cathode thereof will cause a turn-on pulse to be applied to this controlled rectifier which will turn on. A low impedance current path will thus be provided for the stored energy in the inductor L1 which will then pass through the anode-cathode circuit of the controlled rectifier S3 and into the resistors R3 and R1 to be dissipated therein. The conduction of the controlled rectifier S3 thereby clamps the voltage at the junction J1 to the value established at that time which is the desired rated value which had caused the Shockley diode to fire in the first place. On the other hand, if the junction point J2 were positive with respect to the junction point J1 and the voltage thereacross was of the desired value, the Shockley diode DS will breakover with a current path being provided from the junction point J2, through the primary winding W0 from the undotted to the dotted end, through a diode D5 of the bridge, the Shockley diode DS, a diode D6 of the bridge and through the resistor R10 to the junction point J1. A positive voltage is thus induced at the undotted ends of the windings W1 and W2. With the winding W2 having its undotted end connected to the gate electrode of the controlled rectifier S4 and the dotted end connected to the cathode electrode thereof, a turn on pulse is provided to the gate electrode thereof turning it on. A low impedance path is thus provided therethrough for the inductor L2 with the stored energy therein being dissipated in the resistors R2 and R4. The commutation controlled rectifier S2 thus turns off, and the voltage appearing at the junction J1 is clamped to the desired value. Because of the dot convention, only one of the clamping controlled rectifiers is turned on at a time since the dot convention only supplies a positive pulse to the gate electrode of one of the devices at a time. The diodes D7 and D8 respectively connected in series with the windings W1 and W2 prevent any reverse currents flowing in the windings W1 and W2.

Referring again to FIGS. 2 and 3, assume at the time T3 that the voltage level at the junction J1 is $-e$. Also assume at the time T3 that the output of the DC source V has been reduced to a value $E/2$. Thus, at the time T3, when the commutation controlled rectifier S1 is turned on, the capacitor C1 begins to discharge therethrough. Assume that the clamping control rectifier S3 is not turned on and therefore an open circuit exists between the lines X1 and X2 thereby permitting the capacitors C1 and C2 and inductor L1 to ring. The voltage at the junction J1 therefore will not be clamped at the value $E+e$ as was the case for example during the half cycle T1 to T2. The voltage at junction J1 will however increase to the value $+3E/4$ as shown in FIG. 3 at a time T3.

Referring to FIG. 4 it can be seen that the voltage $+3E/4$ is the required voltage to provide the rated commutation voltage with an input voltage of $E/2$. When the voltage $+3E/4$ at the junction point J1 is reached the threshold voltage of the Shockley diode DS will be exceeded with this device breaking down so that current is supplied therethrough into the dotted end of the winding W0. This will turn on the clamping controlled rectifier S3 which will therefore provide a low impedance path to stop the ringing of the capacitor C1 and inductor L1 and dissipate the stored energy in the inductor L1. The voltage at the junction J1 will thereby be clamped at the value $+3E/4$ until the next commutation interval.

At the time T4 the next commutation interval begins with the turning on of the commutation controlled rectifier S2 and the discharge of the capacitor C2 therethrough. Commutation will take place with the bottom row of controlled rectifiers being turned off. However, once the commutation is over the clamping controlled rectifier S4 not being supplied with a turn-on pulse will present an open circuit between the lines Y1 and Y2. Therefore the inductor L2 and capacitors C1 and C2 will resonate with voltage at the junction J1 going negative as shown in FIG. 3 to a value $-E/4$. When the voltage $-E/4$ at junction J1 is reached, the breakover voltage of the Shockley diode DS is reached with a current path being provided through the primary winding W0 into the undotted end thereof. Thus, a positive voltage is provided from the winding W2 at the undotted end thereof to turn on the clamping controlled rectifier S4. The turning on of the rectifier S4 provides a circuit path to dissipate the stored energy in the inductor L1 and thereby stop the ringing action with the capacitor C2. The controlled rectifier S2 is turned off and the voltage at the junction J1 is clamped at the value $-E/4$. This operation will then continue with a voltage swing from a positive peak value of $3E/4$ and a negative peak value of $-E/4$ during subsequent cycles, with the DC voltage from the DC source V being at a value $E/2$. It should be noted however that the sum of the voltage across the capacitor C1 and C2 is the rated value of E so as to provide effective commutation of the bridge controlled rectifiers at the desired current levels. If the input voltage from the DC source V should drop to a lower value, the junction point J1 would ring longer at each commutation in order to insure that the necessary voltage swing occurs and the sum of $$\frac{V_{C1}-V_{C2}}{2}$$

across the commutation capacitors C1 and C2 remains at E. It should be noted, however, that at start up it may require more than one cycle of operation to permit the capacitors to ring up to the desired voltage accumulatively whenever the desired voltage level is greater than twice of the input voltage. It would be necessary under these conditions to hold off the turning on of the bridge controlled rectifiers until the ringing up action had been completed. Otherwise the operation of the inverter system would be identical to that described.

By using the capacitor C9 there is an inherent delay due to the requirement for charging this capacitor, but since the ringing of the commutation capacitors C1 and C2 is essentially linear this delay may be compensated for by a small correction in the voltage division of the resistors R9 and R11.

Figure 5:
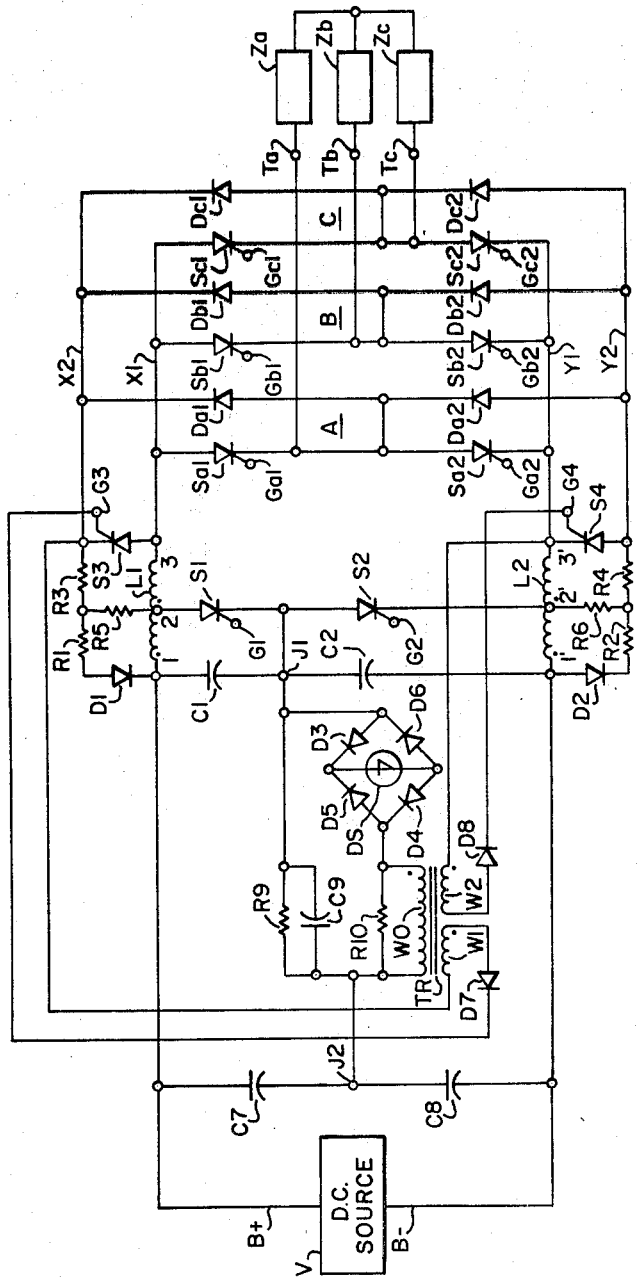
FIG. 5 is a schematic block diagram of another embodiment of the present invention.

FIGURE 5 shows the use of a sensing circuit wherein there is no inherent delay in sensing operation. In FIGURE 5 the resistors R7 and R8, of FIGURE 1 have been eliminated so that only capacitors C7 and C8 are connected between the B+ B— line. Thus the junction point J2 is not fixed at a voltage level half-way between the output voltage of the DC source V but moves as the voltage at the junction point J1 between the commutation capacitor C1 and C2 moves due to current flow through the capacitor C9 which in FIG. 5 is connected directly between the junction points J1 and J2 into the capacitors C7 and C8 from the commutation capacitors C1 and C2. The capacitors C7, C8 and C9 are made small compared with communication capacitors C1 and C2. An AC voltage divider is thus formed by the capacitor C9 and the capacitors C7 and C8 in parallel with the voltage between the junction J1 and the B+ and B— lines. The ratio of the capacitor values C9 and C7–C8 must be selected so that when the voltage at the junction J1 has reached the desired value the voltage on the capacitor C9 is sufficient to breakover the Shockley diode DS. The voltage between the junctions J1 and J2, as shown in the circuity of FIG. 1, is proportional to the voltage across the capacitors C1 and C2; hence, when the desired voltage is reached, the voltage at the junction J1 is the value to which it is to be clamped. Thus, in response to the breakdown of the Shockley diode DS, the primary winding W0 of the transformer TR is activated, with the output pulses being provided from the secondary windings W1 and W2 thereof which will cause either clamping controlled rectifiers S3 or S4 to be turned-on depending upon which of the rows of bridge controlled rectifiers had just been commutated. The operation of the circuitry of FIG. 5 is otherwise identical to that of FIG. 1. The resistor R9 connected across the capacitor C9 is required in order to equalize the potentials at the junction points J1 and J2 prior to each commutation cycle. In the circuit of FIGURE 5 the voltage division is made with capacitive elements rather than resistors. Thus dissipation is held to a minimum and a highly efficient circuit is provided thereby.

In order to change the voltage level at which the commutating capacitor C1 and C2 are to be charged to, it is necessary that one of the circuit components be changed, either the capacitor C9, the Shockley diode DS or other of the circuit components. However, since a fixed change in voltage swing between the commutating capacitors C1 and C2 provides a fixed commutating ability this may be desirable from the standpoint providing continuous operation at the rated commutation voltages.

Although the present invention has been described with a certain degree of particularity, it should be understood that the present disclosure has been made only by way of example and that numerous changes and the details of construction and the combination and arrangements of parts, elements, and components can be resorted to without departing from the spirit and scope of the present invention.

We claim:

1. In inverter apparatus operative with a direct current source for supplying alternating current to a load and including a plurality of controlled switching devices for controllably completing a circuit to said load, the combination of:

inductance means operatively connected between said source and said plurality of controlled switching devices;

capacitance means operatively connected to said source and said inductance means;

a commutating controlled switching device operatively connected to said inductance means and being operative to effect commutation of said plurality of controlled switching devices by providing a discharge path for said capacitance means through said inductance means with said capacitance means resonantly charging to a selected voltage level;

clamping circuit means operatively connected to said inductance means and including a clamping controlled switching device and, sensing means for sensing when said selected voltage level is reached and activating said clamping controlled switching device in response thereto to stop said resonant charging of said capacitance means and clamp said capacitance at said selected voltage level.

2. The combination of claim 1 wherein:

said sensing means including a threshold device responsive to breakdown when said selected voltage level is exceeded to initiate the activation of said clamping controlled switching device.

3. The combination of claim 1 wherein:
said selected voltage level is the required rated voltage for proper commutation of said plurality of controlled switching devices.

4. In inverter apparatus operative with a source of direct current for supplying polyphase alternating current to a polyphase load and including a bridge circuit including a plurality of bridge controlled switching devices in the legs thereof for controllably completing a circuit to said load, the combination of:
first and second inductance means operatively connected, respectively, between the positive and negative terminals of said source of direct current and said bridge circuit;
first and second capacitance means operatively connected in series across said source;
first and second commutating controlled switching devices operatively connected to said first and second inductance means, respectievly, and being operative to effect commutation of said plurality of controlled switching devices by providing a discharge path for said first and second capacitance means, respectively, through said first and second inductance means, respectievly, with said first and second capacitance means resonantly charging to selected voltage levels, respectively;
first and second clamping circuit means operatively connected to said first and second inductance means, respectively, and including first and second clamping controlled switching devices, respectievly, and
sensing means for sensing when said seelcted voltage levels are reached and activating the respective clamping controlled rectifier devices in response thereto to stop said resonant charging of said first and second capacitance means, respectively, and clamp said first and second capacitance means at said selected voltage levels.

5. The combination of claim 4 wherein:
said sensing means including a threshold device responsive to breakdown in response to said selected voltage level being exceeded to initiate the activation of said first and second clamping controlled switching devices,
said selected voltage level being the required rated voltage for proper commutation of said plurality of controlled switching devices in said bridge circuit.

6. The combination of claim 5 wherein:
a first junction point being formed between said first and second capacitance means, a first voltage divider operatively connected across said source of direct current having a second junction point thereon,
said sensing means operatively connected between said first and second junction points for sensing the voltage thereacross proportional to said selected voltage levels.

7. The combination of claim 6 wherein:
said first voltage divider including two sections about said second junction point with voltage across each of sections being substantially equal,
said sensing circuit means including a second voltage divider operatively connected between said first and second junction points, said threshold device operatively connected to said second voltage divider to be responsive to the voltage developed thereacross.

8. The combination of claim 7 wherein:
said sensing circuit means including a transformer including a primary winding operative connected to said threshold device and to said second voltage divider to be activated when said threshold device breaks down, and first and second secondary windings,
said first and second secondary windings connected to said first and second clamping control switching devices, respectively, for activating these devices, respectively, when said threshold device breaks down.

9. The combination of claim 6 wherein:
said first voltage divider comprises a pair of divider capacitors connected in series, with said second junction point being formed therebetween,
said sensing circuit means including a sensing capacitor operatively connected between said first and second junction points, said sensing capacitor and said pair of divider capacitors forming an AC voltage divider for developing a voltage proportional to said selected voltage levels, said sensing circuit also including a transformer comprising a primary winding operatively connected to said threshold device to said sensing capacitor to be activated when said threshold device breaks down, and first and secondary windings, said first and second secondary windings operatively connected to said first and second clamping controlled switching devices, respectively, for activating these devices, respectively, when said threshold device breaks down.

References Cited

UNITED STATES PATENTS

| | | | |
|---|---|---|---|
| 3,315,145 | 4/1967 | Menard. | |
| 3,340,453 | 9/1967 | Bradley et al. | 321—5 |
| 3,406,325 | 10/1968 | Rosa | 321—5 |

FOREIGN PATENTS

| | | |
|---|---|---|
| 950,186 | 2/1964 | Great Britain. |

J. D. TRAMMELL, Primary Examiner

W. H. BEHA, Jr., Assistant Examiner

U.S. Cl. X.R.

321—45